US006992989B2

(12) United States Patent
Chen et al.

(10) Patent No.: US 6,992,989 B2
(45) Date of Patent: Jan. 31, 2006

(54) METHOD FOR SOLVING A MISMATCHED NEGOTIATION PROBLEM BETWEEN AN AUTO-NEGOTIATION MODE AND AN ENFORCE MODE

(75) Inventors: Tai-Cheng Chen, Taipei (TW); Teng-sheng Yu, Taipei (TW)

(73) Assignee: Via Technologies, Inc., Taipei (TW)

( * ) Notice: Subject to any disclaimer, the term of this patent is extended or adjusted under 35 U.S.C. 154(b) by 874 days.

(21) Appl. No.: 09/898,452

(22) Filed: Jul. 5, 2001

(65) Prior Publication Data
US 2002/0039354 A1  Apr. 4, 2002

(30) Foreign Application Priority Data
Jul. 7, 2000 (TW) ................................ 89113494 A

(51) Int. Cl.
H04B 1/44 (2006.01)
(52) U.S. Cl. ..................................... 370/282; 370/278
(58) Field of Classification Search ................ 370/278, 370/296, 389, 391, 465, 468, 282, 279, 277, 370/276; 709/227, 237
See application file for complete search history.

(56) References Cited

U.S. PATENT DOCUMENTS 6,141,350 A * 10/2000 Mahale et al. .............. 370/438
6,215,816 B1 * 4/2001 Gillespie et al. ............ 375/219
6,349,331 B1 * 2/2002 Andra et al. ................ 709/220
6,359,893 B1 * 3/2002 Mills .......................... 370/402
6,457,055 B1 * 9/2002 Hwong et al. .............. 709/227

* cited by examiner

Primary Examiner—Duc Ho
Assistant Examiner—Thien D. Tran
(74) Attorney, Agent, or Firm—Rabin & Berdo, P.C.

(57) ABSTRACT

A method for solving a mismatched negotiation result between an auto-negotiation mode and an enforce mode in an Ethernet. The method is applied to a local device with an auto-negotiation mode, the local device is connected to a remote device, and the local device has a plurality of registers including at least an auto-negotiation advertisement register (ANAR) for recording information advertised to the remote device by the local device, and an auto-negotiation link partner ability register (ANLPAR) for recording an ability of the remote device. First, turn on the auto-negotiation mode. The contents of the ANAR register are set according to a transmission mode enforced by a user when the remote device is in the auto-negotiation mode, and then the auto-negotiation mode is restarted. Next, the contents of the ANAR and the ANLPAR registers are determined whether they are matched. If the contents of the ANAR and the ANLPAR registers are matched, then the local and the remote devices are normally connected; otherwise, the local and the remote devices are disconnected.

14 Claims, 3 Drawing Sheets

METHOD FOR SOLVING A MISMATCHED NEGOTIATION PROBLEM BETWEEN AN AUTO-NEGOTIATION MODE AND AN ENFORCE MODE

This application incorporates by reference Taiwanese application Serial No. 0891134494, Filed Jul. 7, 2000.

BACKGROUND OF THE INVENTION

1. Field of Invention

The present invention relates to a method for solving a mismatched negotiation result between an auto-negotiation mode and an enforce mode in the Ethernet. More particularly, the present invention relates to a method for solving a mismatched negotiation result between an auto-negotiation mode and an enforce mode of network components connected in a full duplex or half duplex mode in a 10/100 Mpbs Ethernet.

2. Description of Related Art

Currently, operation modes for a network card/adaptor includes four modes: 100 Mbps full duplex mode (100FDX), 100 Mbps half duplex mode (100HDX), 10 Mbps full duplex mode (10FDX) and 10 Mbps half duplex mode (10HDX). The full duplex mode can receive and transmit simultaneously in a network, while the half duplex mode can only receive or transmit at the same time.

Most network cards on the market currently can be operated under the aforementioned four operation modes, but an additional auto-negotiation mode is further provided to allow compliancy with older network cards/adaptors. The auto-negotiation mode is used for detecting an operation mode performed on a remote network card in the network, and automatically adjusts the local network card to a best operation mode. Furthermore, in addition to the auto-negotiation mode of the current network card, users can set the network card for an enforce mode; i.e., the users can enforce the network card to be operated in any one of the 100FDX, 100HDX, 10FDX and 10HDX modes.

Assume that when the local device is connected to the remote device in the Ethernet system, the remote device is operated in the auto-negotiation mode, and the local device is enforced to be the 100FDX mode by the user. A parallel detection function of the auto-negotiation mode of the remote device is capable of detecting a most suitable transmission rate between the remote and the local devices. However, the remote device cannot recognize whether the local device is operated in the HDX or FDX mode. If the transmission rates respectively for the local and the remote devices are the same, the network status is set to be a normal connection. Accordingly, the remote device is then set to the 100HDX mode to perform packet receiving and transmitting operations with the local device. Due to different operation modes used at the local and remote devices, packet loss occurs while receiving and transmitting between the local and the remote devices.

FIG. 1 is flow chart illustrating a conventional method for setting a network card/adaptor to operate in an enforce mode. Referring to FIG. 1, at step 102, a local computer is set in a disconnect status and the auto negotiation mode is turned off. Next, at step 104, a transmission rate and the FDX/HDX modes are set. Then, at step 106, the local computer is reset to a connect status.

Referring to Table I, the connection status and the packet lost are listed while the local and the remote devices are set for various operation modes. In Table I, the column is the mode set of the local device, and the row is the mode set of the remote device. Packet loss results from that the parallel detection function of the auto-negotiation mode of the local device only detects that the transmission rate of the remote device is 10 Mpbs or 100 Mbps, but cannot recognize the remote device is operated in the HDX or FDX mode. Therefore, as seen from Table I, in some cases, the remote and the local devices are normally connected, labeled "yes" in the connection status field, however packet loss still occurs, labeled "yes" in the packet loss field. For example, when the user enforces the local device to be the 100FDX mode and the remote device is in the auto detection mode, packet loss occurs.

TABLE I

| mode set (local/remote) | | Auto Negotiation | 100FDX | 100HDX | 10FDX | 10HDX |
|---|---|---|---|---|---|---|
| Auto Negotiation | connection status | Yes | yes | yes | Yes | yes |
| | packet loss | No | yes | no | Yes | no |
| 100FDX | connection status | Yes | yes | yes | No | No |
| | packet loss | Yes | no | yes | | |
| 100HDX | connection status | Yes | yes | yes | No | no |
| | packet loss | No | yes | no | | |
| 10FDX | connection status | Yes | no | no | Yes | Yes |
| | packet loss | Yes | | | No | Yes |
| 10HDX | connection status | Yes | no | no | Yes | yes |
| | packet loss | No | | | Yes | no |

SUMMARY OF THE INVENTION

Therefore, it is an objective of the present invention to provide a method for solving a mismatched negotiation result between an auto-negotiation mode and an enforce mode in the Ethernet. This is effectively solved by enabling the auto-negotiation mode of a local device to advise a suitable transmission mode to a remote device.

Accordingly, the present invention provides a method for solving a mismatched negotiation result between an auto-negotiation mode and an enforce mode in a Ethernet. The method can be applied to a local device with an auto-negotiation mode that is connected to a remote device. The local device further has a plurality of registers comprising at least an auto-negotiation advertisement register (ANAR) for recording information advertised to the remote device by the local device and an auto-negotiation link partner ability register (ANLPAR) for recording the ability of the remote device. Hence, the method comprises steps of: (a) turning on the auto-negotiation mode; (b) determining whether the remote device is in the auto-negotiation mode; (c) setting contents of the ANAR register according to a transmission mode enforced by a user when the remote device is in the auto-negotiation mode; (d) restarting the auto-negotiation mode; (e) determining whether the contents of the ANAR and the ANLPAR registers are matched. If so, then proceed to step (f), otherwise proceed to step (g); (f) setting the local and the remote devices to be normally connected and terminating the method; and (g) disconnecting the local and the remote devices.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 (PRIOR ART) is flow chart illustrating a conventional method for setting a network card/adaptor for an enforce mode.

DESCRIPTION OF THE PREFERRED EMBODIMENTS

Figure 1:
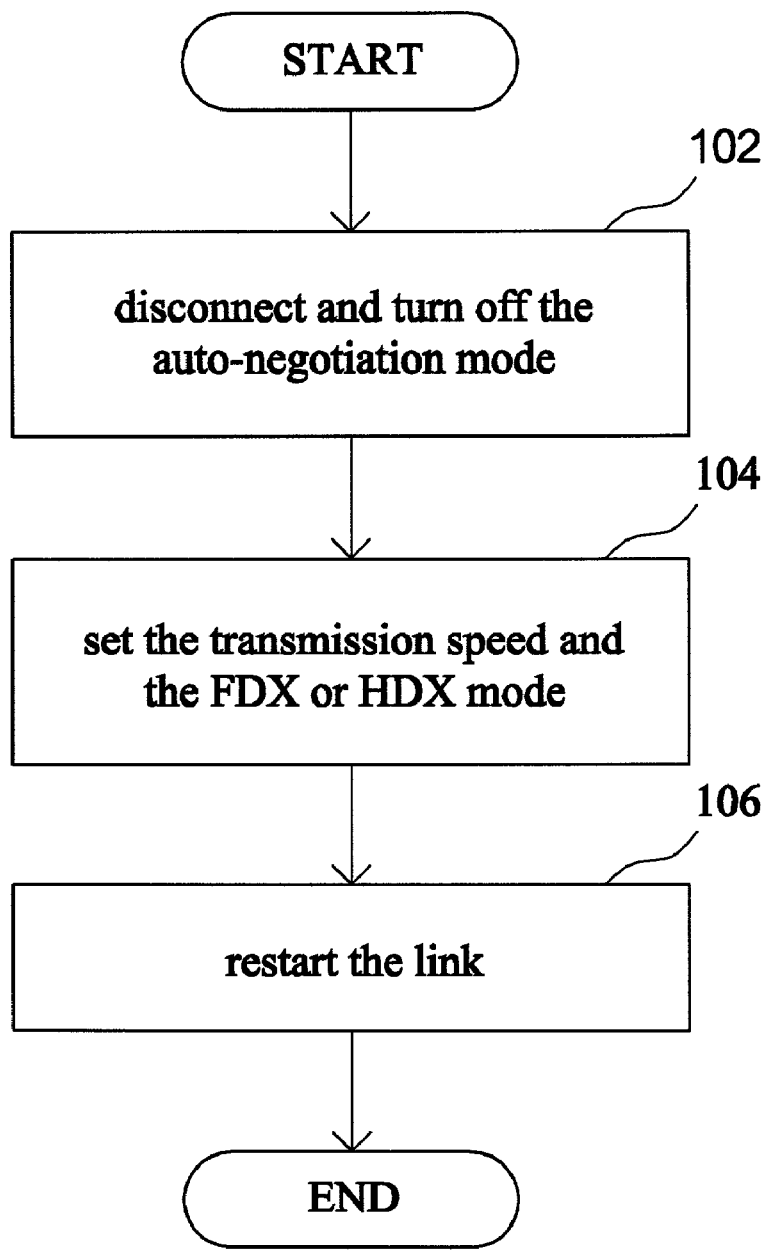

As an example, a local device equipped with the auto-negotiation function and is capable of being enforced in either the 100FDX mode, 100HDX mode, 10FDX mode, or 10HDX mode. In the Ethernet, the local device can be connected to a remote device, whereby the local device and the remote device can be either a local and a remote computer, a local computer and a remote switch, or a local switch and a remote computer. As well, the local and remote devices can be networks connected through a protocol defined by a physical layer device (PHY) described in an Open System Interconnection (OSI) model.

The following descriptions apply the local computer and the remote computer being connected in the Ethernet system.

In the local computer, a driver is used for transmitting commands to the PHY layer of a network card/adaptor through a media access control (MAC) layer and a media independent interface (MII). For example, there are six registers for setting network transmission status, each of which includes 16 bits. The meanings and functions for the registers and bits therein are further described as follows.

A. Basic mode control register (BMCR): The BMCR is used to control operations of the PHY layer, and can be modified by the driver through the MAC layer and the MII. The BMCR register comprises a plurality of bits as shown in the following.

(1) Speed selection (SPD) bit: The transmission rate of the PHY layer is 10 Mbps while the SPD bit is 0 and the PHY layer sends a normal link pulse (NLP) with a pulse interval of 16.8 ms to the remote computer to confirm whether a successful connection is built. When the SPD bit is 1, the transmission rate of the PHY layer is 100 Mbps and the PHY layer sends a normal link pulse (NLP) further comprising a fast link pulse (FLP) with 17~33 link pulses to the remote computer to confirm whether a successful connection is built.

(2) Enable loop-back mode (LPBK) bit: The LPBK bit is used for indicating that the local and the remote computers are disconnected (LPBK bit is 1). If the LPBK bit is 0, the local and the remote computers are connected.

(3) Enable auto-negotiation process (ANEG_EN) bit: When the ANEG_EN bit is 1, the network card is operated in the auto-negotiation mode; when the ANEG_EN bit is 0, the network card is operated in the enforce mode.

(4) Restart auto-negotiation process (ANEG_RST) bit: When the ANEG_RST bit is 1, the auto-negotiation mode of the network card is restarted and related settings of the local computer are advertised to the remote computer.

B. Basic Mode Status Register (BMSR): The BMSR register is used for recording a link status between the local and the remote computers after the PHY layer of the remote network card in the remote computer is detected by the PHY layer of the local network card in the local computer. For example, the BMSR register comprises bits at least as follows.

Link status (LINK) bit: The LINK bit is used for recording a link status between the local and the remote network cards/adaptors.

C. PHY layer identifier register #1 (PHYIDR1) and PHY layer identifier register #2 (PHYIDR2): The PHYIDR1 and PHYIDR2 are respectively used for recording information concerning identifiers of the network cards/adaptors.

D. Auto-negotiation advertisement register (ANAR) and auto negotiation link partner ability register (ANLPAR): The ANAR register is used for recording related information of the local computer advertised to the remote computer in the auto-negotiation mode. The driver can modify the contents of the ANAR register. The ANLPAR register records a link ability of the remote computer. For example, the ANAR and the ANLPAR registers respectively comprises bits as follows.

(1) Received code word recognized (ACK) bit: When the PHY layer of the local computer sends the FLP or NLP to the remote computer, the ACK bit is set to 1 if the PHY layer of the remote computer sends back a responding signal to the local computer; otherwise, the ACK bit is set 0.(2) Capable of 100 Base-TX full duplex operation (TX100F) bit: The TX100F is set to 1 if the local computer is operated in the auto-sensing mode or enforced in the 100FDX mode by the user; otherwise, the TX100F bit is set 0.

(3) Capable of 100 Base-TX half duplex operation (TX100H) bit: The TX100H is set to 1 if the local computer is operated in the auto-sensing mode or enforced in the 100HDX mode by the user; otherwise, the TX100H bit is set 0.

(4) Capable of 10 Base-TX full duplex operation (TX10F) bit: The TX10F is set to 1 if the local computer is operated in the auto-sensing mode or enforced in the 10FDX mode by the user; otherwise, the TX10F bit is set 0.

(5) Capable of 10 Base-TX half duplex operation (TX10H) bit: The TX10H is set to 1 if the local computer is operated in the auto-sensing mode or enforced in the 10HDX mode by the user; otherwise, the TX10H bit is set 0.

In the conventional method, when the local computer is operated in the enforce mode and the remote computer is operated in the auto-negotiation mode, although the local and the remote computer can be linked, packet loss phenomenon occurs. The reason is that the local computer in the enforce mode cannot inform the remote computer in the auto-negotiation mode that the local computer itself is operated in the FDX or HDX mode. Therefore, according to the present invention, even though the local computer is in the enforce mode, the local computer can advertise to the remote computer the setting values of the local computer as the local computer is in the auto-negotiation mode.

Figure 2:
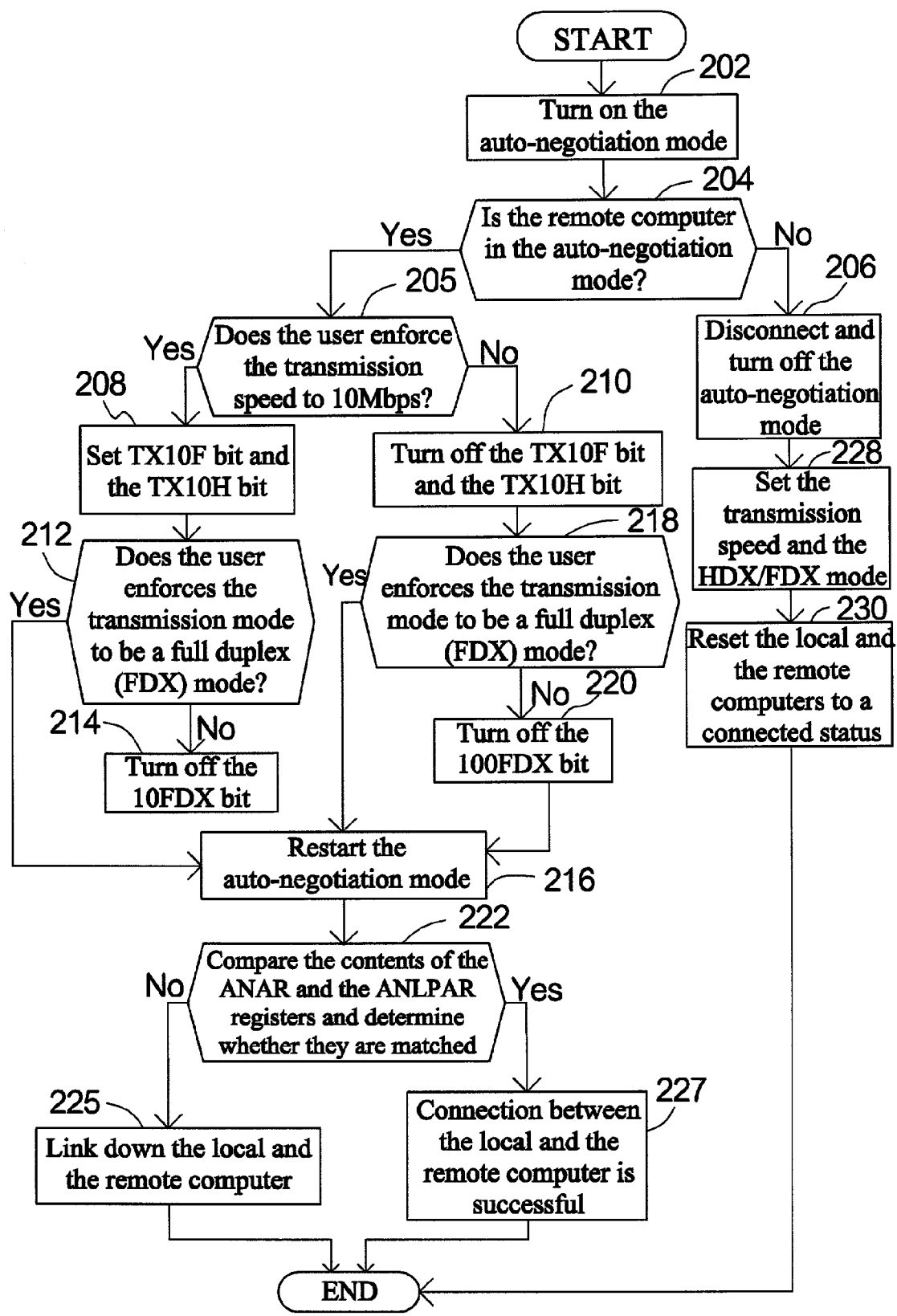
FIG. 2 schematically shows a flow chart of a method for solving a mismatched negotiation result between an auto-negotiation mode and an enforce mode in the Ethernet according to one preferred embodiment of the present invention.

FIG. 2 schematically shows a flow chart of a method for solving a mismatched negotiation result between an auto-negotiation mode and an enforce mode in the Ethernet according to one preferred embodiment of the present invention. In the flow chart, steps 206, 228 and 230 are required steps for when the local and the remote computers are both in the enforce mode and the remote computer does not support the auto-negotiation mode. The other steps are required steps operated according to the present invention.

After the local computer set as the enforce mode by the user is booted, step 202 is first executed. A driver turns on the auto-negotiation mode and sets the local computer in the auto-negotiation mode. Namely, the driver sets the ANEG_EN bit in the BMCR register to be 1. At this time, the local computer sends the FLP to the remote computer. The FLP further comprises related settings of the auto-negotiation mode of the local computer. Next, step 204 is executed to determine whether the remote computer is in the auto-negotiation mode. If the remote computer is operated in the auto-negotiation mode receives the FLP from the local computer, it will also send a FLP to the local computer. After the local computer receives the FLP from the remote computer, the PHY layer sets the ACK bit in the ANLPAR register to 1. Accordingly, the driver can detect whether the ACK bit in the ANLPAR register is 1 to determine whether the remote computer is operated in the auto-negotiation mode. If the ACK bit is 1 then the method proceeds to step 205; otherwise, it proceeds to step 206.

At step 205, whether the transmission speed is enforced to be 10 Mbps by the user is determined. Namely, it is determined whether the user enforced the transmission speed to be 10 Mbps in the operation system (OS). If so, then the method proceeds to step 208; otherwise it proceeds to step 210.

At step 208, the driver has to set the 10FDX and 10HDX modes because the user enforced the transmission speed to be 10 Mbps. Namely, the driver sets the TX100F bit and the TX100H bit in the ANAR register to 0. Next, step 212 is executed to determine whether the enforce mode is the FDX mode. If not, the method proceeds to a step 214; otherwise, it proceeds to step 216. At step 214, the driver also has to turn off the 10FDX mode because the user enforced the enforce mode to be the HDX mode. Namely, the driver sets the TX10F bit in the ANAR register to 0.

Similarly, at step 210, the driver has to turn off the 10FDX mode and the 10HDX mode because the user enforced the transmission speed to be 100 Mbps. Namely, the driver sets the TX10F bit and the TX10H bit in the ANAR register to 0. Next, step 218 is executed to determine whether the enforce mode is the FDX mode. If not, the method proceeds to step 220; otherwise it proceeds to step 216. At step 220, the driver also has to turn off the 100FDX mode because the user enforced the enforce mode to be the HDX mode. Namely, the driver sets the TX100F bit in the ANAR register to 0.

At step 216, the driver restarts the auto-negotiation mode. Namely, the driver set the ANEG_RST bit to 1. The local computer then resends a FLP to the remote computer, in which the contents of the ANAR register of the local computer are encoded in the FLP. When the remote computer receives the FLP, the contents of the ANLPAR of the remote computer are set according to the received FLP. The remote computer also sends a FLP to the local computer for setting the contents of the ANLPAR register.

Furthermore, when the local computer sends the FLP to the remote computer and then receives a FLP from the remote computer, it means that the local and the remote computers are in the transmission speed with 100 Mbps. When the local computer sends the NLP to the remote computer and then receives a NLP from the remote computer, it means that the local and the remote computers are in the transmission speed with 10 Mbps. At this time, the LINK bit in the BMSR register of the local computer is set to 1. Although the LINK bit in the BMSR register can be used for determining whether the transmission speeds of the local and the remote computers are the same, it cannot be used for determining whether the local and the remote computer are in the FDX or HDX mode.

Table II lists the content of the ANAR and the ANLPAR registers, meanings represented by the LINK bit in the BMSR register and the link status when the local computer is enforced in the 10HDX, 10FDX, 100FDX and 100HDX modes respectively.

TABLE II

| Enforce mode | ANAR contents | ANLPAR contents | LINK bit in BMSR | link status |
|---|---|---|---|---|
| 10HDX | TX10H | Auto-negotiation | Success | success |
| | | TX10H | Success | success |
| | | TX10F | Unstable | fail |
| | | TX10F, TX10H | Success | fail |
| | | TX100H | Fail | Fail |
| | | TX100F | Fail | Fail |
| | | TX100F, TX100H | Fail | Fail |
| 10FDX | TX10F | Auto-negotiation | Success | Success |
| | TX10H | TX10H | Success | Fail |
| | | TX10F | Success | Success |
| | | TX10F, TX10H | Success | Success |
| | | TX100H | Fail | Fail |
| | | TX100F | Fail | Fail |
| | | TX100F, TX100H | Fail | Fail |
| 100HDX | TX100H | Auto-negotiation | Success | Success |
| | | TX10H | Fail | Fail |
| | | TX10F | Fail | Fail |
| | | TX10F, TX10H | Fail | Fail |
| | | TX100H | Success | Success |
| | | TX100F | Unstable | Fail |
| | | TX100F, TX100H | Success | Fail |
| 100FDX | TX100F | Auto-negotiation | Success | Success |
| | TX100H | TX10H | Success | Fail |
| | | TX10F | Success | Fail |
| | | TX10F, TX10H | Success | Fail |
| | | TX100H | Success | Fail |
| | | TX100F | Success | Success |
| | | TX100F, TX100H | Success | Success |

From step 208 to step 216, when the user enforces the local computer to operate in the 10FDX mode, the TX10H and TX10F bits in the ANAR register are set to 1. When the user enforces the local computer to be operated in the 100FDX mode, the TX100H and TX100F bits in the ANAR register are set to 1 in order to prevent the local and the remote computers from operating in the FDX mode and the HDX mode respectively when both of the local and the remote computers are turned on to the auto-negotiation mode and operating at the same transmission speed. The auto-negotiation keeps negotiating with each other, causing the LINK bits of the two computers to flip and be unstable.

Next, proceed to step 222 where the content of the ANAR register is compared to that of the ANLPAR register to determine whether they match. This comparison is performed by the driver according to Table II. If the declaration of the link status obtained by the driver is "fail" with reference to Table II, then proceed to step 225 for linking down the local and the remote computers. In contrast, if the declaration of the link status is "success" with reference to Table II, then proceed to step 227 where connection between the local and the remote device is successful.

As shown from Table II, when the local computer is enforced in the 10FDX mode by the user and the remote computer is in the auto-negotiation mode, since, at step 216, the remote computer has recorded the enforce mode of the local computer in the ANLPAR register, the TX10F bit in the ANLPAR register of the remote computer is set to "1". Therefore, the local and the remote computers can be connected in the 10FDX mode and no packet loss occurs. Thus, the LINK bit in the BMSR register is set to "1" and the field of the link status declaration is "success". The driver executes step 227 such that the local and remote computers are normally connected. When the local computer is enforced in the 10FDX mode and the remote computer is enforced in the 10HDX mode, although the LINK bit in the BMSR register is "1" but the field of the link status declaration is "fail". Accordingly, the driver executes step 225 to disconnect the local and the remote computers in order to prevent the packet loss problem as when the local and the remote computers are respectively in the FDX mode and the HDX mode in the conventional scheme.

When the enforce modes for both the local and remote computers are the same, such as the 100FDX, 100HDX, 10FDX or 10HDX mode, the field of the link status declaration is "success" as seen from the table. The driver then executes step 227 to normally connect the local and the remote computers.

Steps 206, 228 and 230 are executed such that the method of the present invention can be compatible with the conventional method. At step 206, when the auto-negotiation mode is not supported by the remote computer, the driver sets the local computer to a disconnect status and turns off the auto-negotiation mode. Namely, the driver sets the LPBK bit in the BMCR register as well as the ANEG_EN bit to "0". Next, at step 228, the driver sets the transmission speed and the HDX/FDX mode. Then, the method proceeds to step 230 where the driver resets the local and the remote computers to a connected status; i.e., the driver sets the LPBK bit in the BMCR register to "1".

Table III lists the link status and the packet loss for the remote and the local computers under different modes according to the method of the present invention. In the mode setting, the row represents the settings of the local computer while the column represents that of the remote computer. Please refer to both Tables I and III. In Table I, when the local computer is enforced in the 100FDX mode by the user and the remote computer is in the auto-negotiation mode, the local and the remote computers are normally linked but packet loss occurs. However, in Table III, according to the present invention, when the local computer is enforced in the 100FDX mode by the user and the remote computer is in the auto-negotiation mode, the local and the remote computers are normally linked but no packet loss occurs.

TABLE III

| Mode setting | | Auto-negotiation | 100 FDX | 100 HDX | 10 FDX | 10 HDX |
|---|---|---|---|---|---|---|
| Auto-negotiation | Link status | Yes | Yes | Yes | Yes | Yes |
| | Packet loss | No | No | No | No | No |

TABLE III-continued

| Mode setting | | Auto-negotiation | 100 FDX | 100 HDX | 10 FDX | 10 HDX |
|---|---|---|---|---|---|---|
| 100FDX | Link status | Yes | Yes | No | No | No |
| | Packet loss | No | No | | | |
| 100HDX | Link status | Yes | No | Yes | No | No |
| | Packet loss | No | | No | | |
| 10FDX | Link status | Yes | No | No | Yes | No |
| | Packet loss | No | | | No | No |
| 10HDX | Link status | Yes | No | No | No | Yes |
| | Packet loss | No | | | | No |

Figure 3:
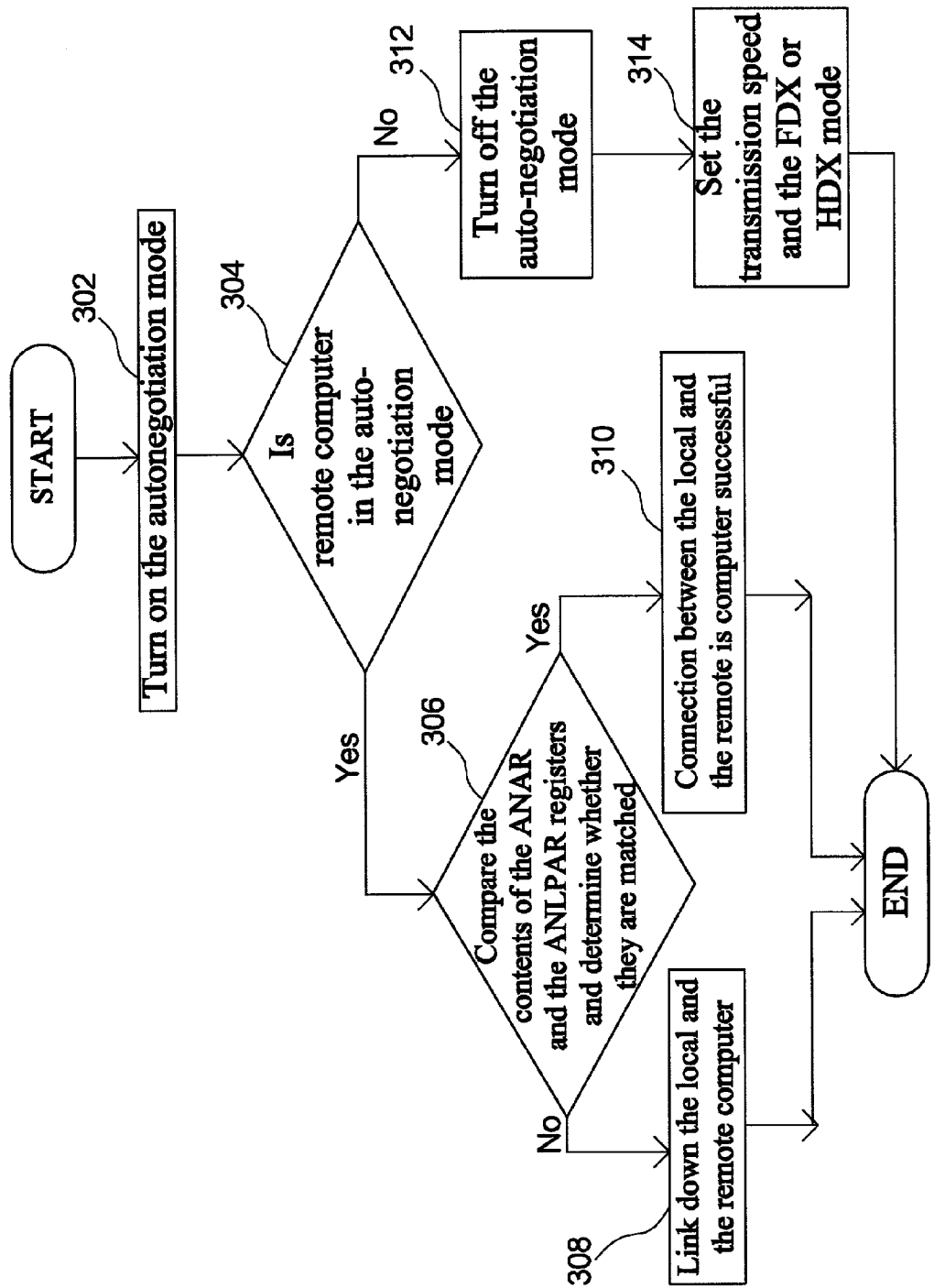
FIG. 3 illustrates a flow chart of restarting a link process in FIG. 2 according to the preferred embodiment of the present invention.

FIG. 3 illustrates a flow chart of restarting a link process in FIG. 2 according to the preferred embodiment of the present invention. Referring to FIG. 2, at step 227, when the local and the remote computers restart the link after link down, the required settings are as follows. In FIG. 3, at step 302, the driver turns the auto-negotiation mode on and sets the local computer to the auto-negotiation mode. Namely, the driver sets the ANEG_EN bit in the BMCR register to "1" such that the local computer is in the auto-negotiation mode. Next, in step 304, the driver determines whether the remote computer is in the auto-negotiation mode. If so, then in step 306, the driver compares the ANAR and the ANLPAR registers for determining whether they are matched. If the field of the link status declaration is "fail", then step 308 is executed where the driver links down the local and the remote computers. If the field of the link status declaration is "success", then step 310 is executed where the connection between the local and the remote computers is successful.

If the driver detects that the remote computer is not in the auto-negotiation mode in step 304, then proceed to step 312. At step 312, the driver turns the auto-negotiation mode off. Next, in step 314, the driver sets the transmission speed and the operation mode in either the HDX or the FDX mode.

As shown in FIG. 3, during the link restart phase after the network is linked down, it is unnecessary for the driver to reset the values of the ANAR and the ANLPAR registers. Therefore, by comparing the ANAR and the ANLPAR registers, whether the network is normally connected or whether the packet loss occurs can be recognized.

According to the present invention described above, the local device turns the auto-negotiation mode on and informs the remote computer a suitable operation mode, and therefore a mismatched negotiation result between an auto-negotiation mode and an enforce mode can be effectively solved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for solving a mismatched negotiation result between an auto-negotiation mode and an enforce mode in a Ethernet, the method being applied to a local device with an auto-negotiation mode, the local device being connected to a remote device, the local device having a plurality of registers comprising at least an auto-negotiation advertisement register (ANAR) for recording information advertised to the remote device by the local device, and an auto-negotiation link partner ability register (ANLPAR) for recording an ability of the remote device, the method comprising steps of:
   (a) turning on the auto-negotiation mode;
   (b) determining whether the remote device is in the auto-negotiation mode;
   (c) setting contents of the ANAR register according to a transmission mode enforced by a user when the remote device is in the auto-negotiation mode;
   (d) restarting the auto-negotiation mode;
   (e) determining whether the contents of the ANAR and the ANLPAR registers are matched, and if the contents of the ANAR and the ANLPAR registers are matched proceeding to a step (f), and otherwise proceed to a step (g);
   (f) setting the local and the remote devices to be normally connected and terminating the method; and
   (g) disconnecting the local and the remote devices.

2. The method of claim 1, wherein the transmission mode of the local device enforced by the user is selected from a group consisting of a 100 Mbps full duplex mode (100FDX), a 100 Mbps half duplex mode (100HDX), a 10 Mbps full duplex mode (10FDX), and a 10 Mbps half duplex mode (10HDX).

3. The method of claim 2, wherein in the step (c), when the remote device is in the auto-negotiation mode, further comprises steps of:
   (c1) determining whether the user enforces a transmission speed to 10 Mbps, and if the transmission speed is 10 Mbps proceeding to a step (c2), otherwise proceed to a step (c5);
   (c2) turning off the 100FDX mode and the 100HDX mode;
   (c3) determining whether the user enforces the transmission mode to be a full duplex (FDX) mode, and if the transmission mode is the FDX mode proceeding to the step (d), otherwise proceed to a step (c4);
   (c4) turning off the 10FDX mode and proceeding to the step (d);
   (c5) turning off the 10FDX mode and the 10HDX mode;
   (c6) determining whether the user enforces the transmission mode to be the FDX mode, and if the transmission mode is the FDX mode proceeding to the step (d), otherwise proceed to a step (c7); and
   (c7) turning off the 100FDX mode.

4. The method of claim 1, wherein in the step (b) when the remote device is not in the auto-negotiation mode, further comprises steps of:
   (b1) setting the local device to a disconnected status and turning off the auto-negotiation mode;
   (b2) setting the transmission mode;
   (b3) resetting the local device to a connected status; and
   (b4) terminating the method.

5. The method of claim 1, wherein after the step (f), further comprising steps of:
   (f1) turning on the auto-negotiation mode when the local and the remote devices restart the link after link down;
   (f2) determining whether the contents of the ANAR and the ANLPAR are matched; and
   (f3) disconnecting the local and the remote devices if the contents of the ANAR and the ANLPAR registers are not matched.

6. The method of claim 5, wherein in the step (f2) when the remote device is not in the auto-negotiation mode, further comprising steps of:
   (f5) turning off the auto-negotiation mode; and
   (f6) setting the transmission mode.

7. The method of claim 1, wherein the local device is a local computer or a local switch.

8. The method of claim 1, wherein the remote device is a remote computer or a remote switch.

9. A method for solving a mismatched negotiation result between an auto-negotiation mode and an enforce mode in a Ethernet, the method being applied to a local device with an auto-negotiation mode, the local device being set to one of a 100 Mbps full duplex mode (100FDX), a 100 Mbps half duplex mode (100HDX), a 10 Mbps full duplex mode (10FDX) and a 10 Mbps half duplex mode (10HDX), the local device being connected to a remote device, the local device having a plurality of registers comprising at least an auto-negotiation advertisement register (ANAR) for recording information advertised to the remote device by the local device, and an auto-negotiation link partner ability register (ANLPAR) for recording an ability of the remote device, the method comprising steps of:
   (a) turning on the auto-negotiation mode;
   (b) determining whether the remote device is in the auto-negotiation mode;
   (c) determining whether a transmission speed of 10 Mbps is enforced by a user when the remote device is in the auto-negotiation mode, and if the transmission speed is 10 Mbps then proceed to a step (d), otherwise proceed to a step (g);
   (d) turning off the 100FDX mode according to contents of the ANAR register;
   (e) determining whether the user enforces the transmission mode to be a full duplex (FDX) mode, and if the transmission mode is the FDX mode proceeding to a step (j), otherwise proceed to a step (f);
   (f) turning off the 10FDX mode according to the ANAR register and proceeding to the step (j);
   (g) turning off the 10FDX and the 10HDX modes according to the ANAR register;
   (h) determining whether the user enforces the transmission mode to the FDX mode, and if the transmission mode is the FDX mode proceeding to the step (j), otherwise proceed to a step (i);
   (i) turning off the 100FDX mode;
   (j) restarting the auto-negotiation mode;
   (k) determining whether the contents of the ANAR and the ANLPAR registers are matched; and
   (l) disconnecting the local and the remote devices if the contents of the ANAR and the ANLPAR registers are not matched.

10. The method of claim 9, wherein in step (b), when the remote device is not in the auto-negotiation mode, further comprises steps of:
   (b1) setting the local device to a disconnected status and turning off the auto-negotiation mode;
   (b2) setting the transmission mode;

(b3) resetting the local device to a connected status; and
(b4) terminating the method.

11. The method of claim 9, wherein after the step (l), further comprising steps of:
- l1) turning on the auto-negotiation mode when the local and the remote devices restart the link after link down;
- (l2), determining whether the contents of the ANAR and the ANLPAR registers are matched; and
- (l3), disconnecting the local and the remote devices if the contents of the ANAR and the ANLPAR registers are not matched.

12. The method of claim 11, wherein in the step (l2), when the remote device is not in the auto-negotiation mode, further comprising steps of:
- (l5), turning off the auto-negotiation mode; and
- (l6), setting the transmission mode.

13. The method of claim 9, wherein the local device is a local computer or a local switch.

14. The method of claim 9, wherein the remote device is a remote computer or a remote switch.

* * * * *